(12) United States Patent
Mondrusov et al.

(10) Patent No.: US 12,259,295 B2
(45) Date of Patent: Mar. 25, 2025

(54) SYSTEM AND METHOD FOR CONTROLLING AN ELECTRONIC DISPLAY TO GUIDE A DRIVER WHEN EXECUTING DISTANCE-BASED DRIVE CYCLES

(71) Applicants: AVL Test Systems, Inc., Plymouth, MI (US); AVL Emissions Test Systems GmbH, Neuss (DE)

(72) Inventors: Eugene Mondrusov, Livonia, MI (US); Mark T. Oliver, Brighton, MI (US); Dmitry Romanovich, Minsk (BY); Dzmitry Markavets, Minsk (BY); Alexander Abramov, Minsk (BY)

(73) Assignees: AVL Test Systems, Inc., Plymouth, MI (US); AVL Emissions Test Systems GmbH, Neuss (DE)

( * ) Notice: Subject to any disclaimer, the term of this patent is extended or adjusted under 35 U.S.C. 154(b) by 592 days.

(21) Appl. No.: 17/397,729

(22) Filed: Aug. 9, 2021

(65) Prior Publication Data

US 2022/0050022 A1 Feb. 17, 2022

Related U.S. Application Data

(60) Provisional application No. 63/065,144, filed on Aug. 13, 2020.

(51) Int. Cl.
*G01M 17/02* (2006.01)
*B60K 35/00* (2024.01)
(Continued)

(52) U.S. Cl.
CPC .......... *G01M 17/022* (2013.01); *B60K 35/00* (2013.01); *G01C 23/00* (2013.01); *G01P 3/50* (2013.01); *B60K 35/22* (2024.01)

(58) Field of Classification Search
CPC . G01M 17/022; B60K 35/00; B60K 2370/90; B60K 2370/152; G01C 23/00; G01P 3/50; G06F 3/147
See application file for complete search history.

(56) References Cited

U.S. PATENT DOCUMENTS

| 5,719,765 A | 2/1998 | Book |
| 2012/0242513 A1 | 9/2012 | Oguchi et al. |

(Continued)

FOREIGN PATENT DOCUMENTS

| EP | 3687874 A1 | 8/2020 |
| JP | S64-006542 B2 | 2/1989 |

(Continued)

OTHER PUBLICATIONS

Machine Translation of JP H08-170938 (Year: 1996).*

(Continued)

*Primary Examiner* — Jennifer Bahls
*Assistant Examiner* — Quang X Nguyen
(74) *Attorney, Agent, or Firm* — Honigman LLP; Matthew H. Szalach

(57) ABSTRACT

A method for providing a visual aid to guide a driver when executing a test cycle includes controlling an electronic display to display a graph including a target trace indicating a target speed of a vehicle during the test cycle and a first visual indicator of an actual speed of the vehicle during the test cycle, scroll the target trace from a first side of the graph to a second side of the graph during a time-based portion of the test cycle to indicate the target vehicle speed with respect to an amount of time elapsed since a start of the test cycle, and scroll the target trace from the first side of the graph to the second side of the graph during a distance-based portion of the test cycle to indicate the target vehicle speed with respect to a distance travelled by the vehicle during the test cycle.

15 Claims, 13 Drawing Sheets

(51) Int. Cl.
  *G01C 23/00*   (2006.01)
  *G01P 3/50*    (2006.01)
  *B60K 35/22*   (2024.01)

(56) References Cited

U.S. PATENT DOCUMENTS

2015/0084762 A1* 3/2015 Okada .................. B60Q 3/10
                                                340/441
2017/0345225 A1* 11/2017 Adachi ................ G07C 5/06

FOREIGN PATENT DOCUMENTS

| JP | H08-170938 A      | 7/1996 |
| JP | 2017-111116 A     | 6/2017 |
| WO | WO-2011010617 A1  | 1/2011 |
| WO | WO-2019060938 A1  | 4/2019 |

OTHER PUBLICATIONS

Japanese Patent Office, First Office Action for Application No. 2021-131661 dated Aug. 22, 2022.
European Patent Office, Extended EP Search Report for Application No. 21191162.3 dated Dec. 20, 2021.

* cited by examiner

SYSTEM AND METHOD FOR CONTROLLING AN ELECTRONIC DISPLAY TO GUIDE A DRIVER WHEN EXECUTING DISTANCE-BASED DRIVE CYCLES

CROSS REFERENCE TO RELATED APPLICATIONS

This application claims priority under 35 U.S.C. § 119(e) to U.S. Provisional Application 63/065,144, filed on Aug. 13, 2020. The disclosure of this prior application is considered part of the disclosure of this application and is hereby incorporated by reference in its entirety.

FIELD

The present disclosure relates to systems and methods for controlling an electronic display to guide a driver when executing distance-based drive cycles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In vehicle testing applications such as exhaust emissions testing and electric vehicle range testing, a vehicle is typically driven according to a test schedule that specifies a target vehicle speed with respect to the amount of time that has elapsed during a test cycle. In such vehicle testing applications, an electronic display is positioned within view of a driver of the vehicle, the electronic display provides visual indicators of the actual vehicle speed and the target vehicle speed, and the electronic display adjusts the target vehicle speed with respect to the elapsed time. In turn, the driver uses the visual indicators as a guide while the driver attempts to minimize the difference between the actual vehicle speed and the target vehicle speed by adjusting the amount by which the driver's foot depresses the accelerator pedal of the vehicle.

SUMMARY

An example of a method for providing a visual aid to guide a driver of a vehicle when executing a test cycle that includes a time-based portion and a distance-based portion is disclosed. The method includes controlling an electronic display to (i) display a graph including a target trace indicating a target speed of the vehicle during the test cycle and a first visual indicator of an actual speed of the vehicle during the test cycle, (ii) scroll the target trace from a first side of the graph to a second side of the graph during the time-based portion of the test cycle to indicate the target vehicle speed with respect to an amount of time elapsed since a start of the test cycle, and (iii) scroll the target trace from the first side of the graph to the second side of the graph during the distance-based portion of the test cycle to indicate the target vehicle speed with respect to a distance travelled by the vehicle during the test cycle.

In one example, the method further includes controlling the electronic display to (i) scroll the target trace from the first side of the graph to the second side of the graph at a constant speed during the time-based portion of the test cycle and (ii) during the distance-based portion of the test cycle, adjust a speed at which the target trace is scrolled from the first side of the graph to the second side of the graph based on the distance travelled.

In one example, the target trace is plotted with respect to a first axis indicating speed, a second axis indicating time, and a third axis indicating distance.

In one example, the first visual indicator is a cursor plotted with respect to the first axis and at least one of the second and third axes, and the method further includes controlling the electronic display to move the cursor parallel to the first axis to indicate a change in the actual vehicle speed.

In one example, the method further includes controlling the electronic display to adjust an amount of a preview trace displayed based on the actual vehicle speed, where the preview trace is a portion of the target trace disposed between the cursor and the first side of the graph.

In one example, the method further includes controlling the electronic display to (i) increase the amount of the preview trace displayed when the actual vehicle speed increases, and (ii) decrease the amount of the preview trace displayed when the actual vehicle speed decreases.

In one example, the method further includes controlling the electronic display to display a second visual indicator of a deviation between the distance travelled and a target distance.

In one example, the second visual indicator includes a line parallel to the first axis, a distance between the line and the cursor indicates the deviation between the distance travelled and the target distance, and the method further includes controlling the electronic display to move the line parallel to at least one of the second and third axes to indicate a change in the deviation between the distance travelled and the target distance.

In one example, the second visual indicator includes an arrow that (i) points in a first direction when the distance travelled is less than the target distance, and (ii) points in a second direction opposite of the first direction when the distance travelled is greater than the target distance.

In one example, the second visual indicator includes a value indicating a magnitude of the deviation between the distance travelled and the target distance.

In one example, the method further includes controlling the electronic display to adjust a speed at which the target trace is scrolled from the first side of the graph to the second side of the graph during the distance-based portion of the test cycle based on a deviation between the distance travelled and a target distance.

In one example, the method further includes controlling the electronic display to (i) increase the scroll speed of the target trace when the distance travelled is greater than the target distance, and (ii) decrease the scroll speed of the target trace when the distance travelled is less than the target distance.

Another example of a method for providing a visual aid to guide a driver of a vehicle when executing a test cycle is disclosed. The method includes controlling an electronic display to (i) display a graph including a target trace indicating a target speed of the vehicle during the test cycle and a first visual indicator of an actual speed of the vehicle during the test cycle, (ii) scroll the target trace from a first side of the graph to a second side of the graph to indicate the target vehicle speed with respect to at least one of an amount of time elapsed since a start of the test cycle and a distance travelled by the vehicle during the test cycle, and (iii) adjust an amount of a preview trace displayed based on the actual vehicle speed, where the preview trace is a portion of the target trace corresponding to at least one of a future time and a future distance in the test cycle.

In one example, the method further includes controlling the electronic display to (i) scroll the target trace from the first side of the graph to the second side of the graph to indicate the target vehicle speed with respect to the amount of time elapsed since the start of the test cycle during a time-based portion of the test cycle, and (ii) scroll the target trace from the first side of the graph to the second side of the graph to indicate the distance travelled by the vehicle during a distance-based portion of the test cycle.

In one example, the method further includes controlling the electronic display to (i) scroll the target trace from the first side of the graph to the second side of the graph at a constant speed during the time-based portion of the test cycle, and (ii) during the distance-based portion of the test cycle, adjust a speed at which the target trace is scrolled from the first side of the graph to the second side of the graph based on the distance travelled.

In one example, the method further includes controlling the electronic display to adjust a speed at which the target trace is scrolled from the first side of the graph to the second side of the graph during the distance-based portion of the test cycle based on a deviation between the distance travelled and a target distance.

Yet another example of a method for providing a visual aid to guide a driver of a vehicle when executing a test cycle is disclosed. The method includes controlling an electronic display to (i) display a graph including a target trace indicating a target speed of the vehicle during the test cycle and a first visual indicator of an actual speed of the vehicle during the test cycle, (ii) scroll the target trace from a first side of the graph to a second side of the graph to indicate the target vehicle speed with respect to at least one of an amount of time elapsed since a start of the test cycle and a distance travelled by the vehicle during the test cycle, and (iii) display a second visual indicator of a deviation between the distance travelled and a target distance.

In one example, the second visual indicator includes a line, a distance between the line and the first visual indicator indicates the deviation between the distance travelled and the target distance, and the method further includes controlling the electronic display to move the line toward or away from the first visual indicator to indicate a change in the deviation between the distance travelled and the target distance.

In one example, the second visual indicator includes an arrow that (i) points in a first direction when the distance travelled is less than the target distance, and (ii) points in a second direction opposite of the first direction when the distance travelled is greater than the target distance.

In one example, the second visual indicator includes a value indicating a magnitude of the deviation between the distance travelled and the target distance.

Yet another method for providing a visual aid to guide a driver of a vehicle when executing a test cycle is disclosed. The method includes controlling an electronic display to (i) display a graph including a target trace indicating a target speed of the vehicle during the test cycle, a vehicle speed indicator indicating an actual speed of the vehicle during the test cycle, and a road grade indicator indicating a gradient of a road on which the vehicle is travelling, (ii) scroll the target trace from a first side of the graph to a second side of the graph to indicate the target vehicle speed with respect to at least one of an amount of time elapsed since a start of the test cycle and a distance travelled by the vehicle during the test cycle, and (iii) scroll the road grade indicator from the first side of the graph to the second side of the graph to indicate the road gradient with respect to at least one of the amount of time elapsed since the start of the test cycle and the distance travelled by the vehicle during the test cycle.

In one example, the road grade indicator includes a first color indicating an uphill gradient and a second color indicating a downhill gradient.

In one example, a fade of the first and second colors indicates a percentage of the road gradient.

In one example, the road grade indicator includes a first symbol indicating an uphill gradient and a second symbol indicating a downhill gradient.

In one example, a concentration of the first and second symbols indicates a percentage of the road gradient.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A system and method according to the present disclosure provides one or more visual indicators of a target speed of a vehicle and an actual speed of the vehicle when executing a test cycle that includes both time-based portions and distance-based portions. During the time-based portions of the test cycle, the vehicle is driven according to a test schedule that specifies the target vehicle speed with respect to the amount of time that has elapsed during the test cycle. During the distance-based portions of the test cycle, the vehicle is driven according to a test schedule that specifies the target vehicle speed with respect to the distance (or effective distance) travelled by the vehicle during the test cycle.

In one example, the visual indicator of the target vehicle speed is a line plotted with respect to an x-axis representing vehicle speed, a y-axis representing time elapsed since the start of the test cycle, and another y-axis representing distance travelled since the start of the test cycle. In addition, the visual indicator of the actual vehicle speed is a cursor that moves parallel to the x-axis, and the distance between the cursor and the line indicates the difference between the actual vehicle speed and the target vehicle speed. In another example, the system and method scrolls the line from one side of the graph to another side of the graph at a constant speed during the time-based portions, and the system and method adjusts the scroll speed of the line based on the distance travelled during the distance-based portions. In the above examples and other examples provided herein, the visual indicators guide the driver during both the time-based portions and the distance-based portions while the driver attempts to minimize the difference between the actual vehicle speed and the target vehicle speed.

Figure 1:
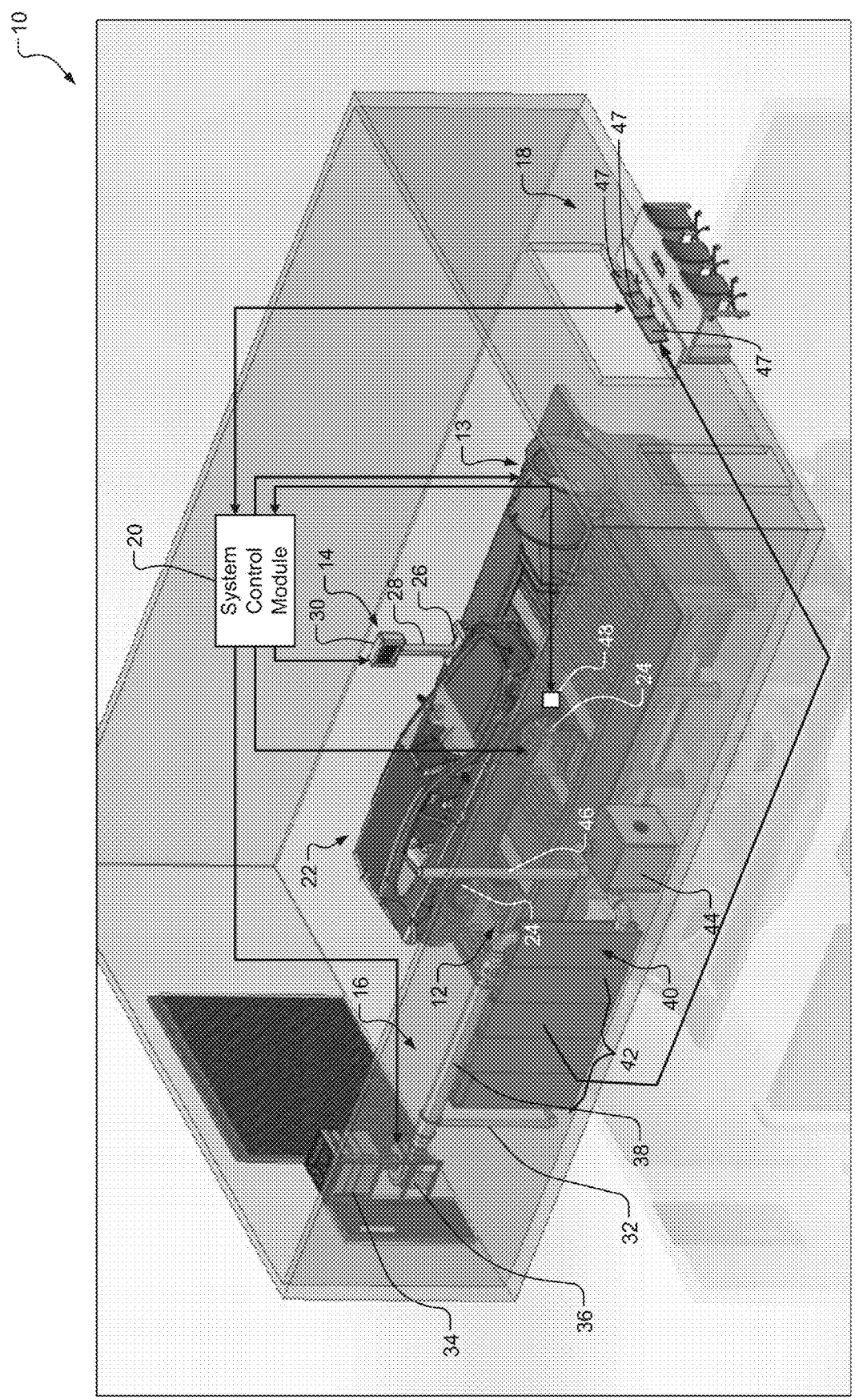
FIG. 1 is a perspective view of an example vehicle test system according to the principles of the present disclosure.

Referring now to FIG. 1, a vehicle test system 10 includes a chassis dynamometer 12, an ambient air blower 13, a display assembly 14, exhaust sampling and analysis equipment 16, a control room 18, and a system control module 20. The chassis dynamometer 12 is configured to support a vehicle 22. The vehicle 22 may be referred to as a unit under test. When a test is performed, the vehicle 22 is driven onto the chassis dynamometer 12 so that wheels 24 of the vehicle 22 are positioned on the chassis dynamometer 12. During a test, the chassis dynamometer 12 applies a load that resist rotation of the wheels 24 according to a predetermined test schedule.

The ambient air blower 13 is operable to blow ambient air past the vehicle 22. The ambient air blower 13 may blow ambient air past the vehicle 22 at a constant speed during a test. Alternatively, the ambient air blower 13 may blow ambient air past the vehicle 22 at a speed that varies according to a predetermined test schedule.

In the example shown, the display assembly 14 includes a base 26, a pedestal 28, and an electronic display 30. The base 26 is fixed to the ground and supports the pedestal 28 and the electronic display 30. The pedestal 28 positions the electronic display 30 and a height that is within the view of a driver of the vehicle 22. The electronic display 30 is operable to display a graphical user interface (GUI) for guiding the driver when performing a test cycle that includes both a time-based portion and a distance-based portion. The test cycle may be regulatory "cruise" cycles, heavy-duty transient test cycles, or road-to-laboratory cycles. In one example, the test cycle is specified by 40 CFR § 1037.510 (a)(2), with applicable cycles and road grade information provided in Appendices I and IV that section.

In other examples, the base 26 and the pedestal 28 are omitted from the display assembly 14, and the electronic display 30 is positioned within view of the driver in other ways. For example, the display assembly 14 may include an articulating arm (not shown) fixed to the ceiling or wall of the test cell, the electronic display 30 may be mounted to the articulating arm, and the articulating arm may be used to position the electronic display 30 within view of the driver. In another example, the electronic display 30 may be held within a box (not shown) that is mounted by suction cups to the outside surface of the windshield of the vehicle 22. In another example, the electronic display 30 may be part of a portable tablet or laptop computer that is located inside of the vehicle 22.

The exhaust sampling and analysis equipment 16 may be a constant volume sampling system, a bag mini diluter system, or a raw exhaust sampling system. The exhaust sampling and analysis equipment 16 includes an exhaust tailpipe extension 32, a dilution air filter 34, a dilution air blower 36, a dilution air tunnel 38, a particulate measurement instrument 40, a gaseous emissions analyzer 42, a diluted exhaust filter 44, and a diluted exhaust vent line 46. The exhaust tailpipe extension 32 extends from an exhaust tailpipe of the vehicle 22 to the dilution air tunnel 38. During a test, exhaust gas produced by an engine of the vehicle 22 flows through the exhaust tailpipe extension 32 to the dilution air tunnel 38.

The dilution air blower 36 draws dilution air (e.g., ambient air) through the dilution air filter 34 and sends the dilution air to the dilution air tunnel 38. During a test, the dilution air blower 36 may draw dilution air through the dilution air filter 34 at a constant rate. Alternatively, the dilution air blower 36 may draw dilution air through the dilution air filter 34 at a rate that varies according to a predetermined test schedule. The dilution air filter 34 removes pollutants from dilution air drawn through the dilution air filter 34. In the dilution air tunnel 38, exhaust gas from the exhaust tailpipe extension 32 mixes with dilution air drawn through the dilution air filter 34.

The particulate measurement instrument 40 receives diluted exhaust gas from the dilution air tunnel 38 and measures the amount of particulate (e.g., soot, sulfate, soluble organic fraction) in the diluted exhaust gas. In one example, the particulate measurement instrument 40 includes a particulate filter that collects particulate from the diluted exhaust gas during a test cycle. At the end of the test cycle, the particulate filter is removed from the particulate measurement instrument 40, and the mass of the particulate collected by the particulate filter is measured using a scale.

The gaseous emissions analyzer 42 receives diluted exhaust gas from the dilution air tunnel 38 and measures the amount of gaseous emissions (e.g., hydrocarbon, carbon monoxide, nitrogen oxide) in the diluted exhaust gas. In one example, the gaseous emissions analyzer 42 measures the amount of gaseous emissions in the diluted exhaust gas in real-time during a test and outputs a signal indicating the measured amount of gaseous emissions. When measuring the amount of gaseous emissions in the diluted exhaust gas in real-time, the gaseous emissions analyzer 42 may make these measurements at a predetermined rate.

Diluted exhaust gas from the dilution air tunnel 38 may flow through the particulate measurement instrument 40 and the gaseous emissions analyzer 42 in parallel. The diluted exhaust vent line 46 receives diluted exhaust gas from the particulate measurement instrument 40 and/or the gaseous emissions analyzer 42. The diluted exhaust vent line 46 vents the diluted exhaust gas into the atmosphere. The diluted exhaust filter 44 is disposed in the diluted exhaust vent line 46 and removes pollutants from the diluted exhaust gas passing through the diluted exhaust vent line 46.

The control room 18 includes one or more computers (e.g., desktop computers, laptop computers, tablets) 47 that may be used by an operator in the control room 18 to interface with the system control module 20 and/or the gaseous emissions analyzer 42. The operator may use the computers 47 to communicate with other components of the vehicle test system 10 and/or the driver of the vehicle 22. For example, the operator may command the computers 47 to output a signal to the system control module 20 indicating when a test cycle begins and/or ends. In another example, the gaseous emissions analyzer 42 may output a signal to the computers 47 indicating the gaseous emissions levels measured by the gaseous emissions analyzer 42, and the computers 47 may display the measured gaseous emissions levels.

The system control module 20 controls the electronic display 30 to display a GUI that guides a driver during a test cycle that includes both a time-based portion and a distance-based portion. During the time-based portion of the test cycle, the system control module 20 controls the electronic display 30 to display a target speed of the vehicle 22 with respect to the amount of time that has elapsed while the test cycle is performed. Those portions of the test cycle that occur at a vehicle speed of zero are typically time-based since the wheels 24 of the vehicle 22 are not moving, and therefore the distance travelled by the vehicle 22 is not changing. During the distance-based portion of the test cycle, the system control module 20 controls the electronic display 30 to display the target speed of the vehicle 22 with respect to the effective distance travelled by the vehicle 22 while the test cycle is performed. During both portions of the test cycle, the driver views the electronic display 30 and attempts to minimize the difference between the actual speed of the vehicle 22 and the target speed of the vehicle. The system control module 20 may control the electronic display to start displaying the GUI when the operator commands the computers 47 to output the signal to the system control module 20 initiating the test cycle.

The system control module 20 may determine the effective distance travelled by the vehicle 22 during the test cycle based on an input from a vehicle speed sensor 48. The vehicle speed sensor 48 measures the speed of the vehicle 22 by, for example, monitoring the time period that elapses as one of the wheels 24 completes a rotation. The system control module 20 may determine the effective distance travelled by vehicle 22 by periodically determining the product of the vehicle speed and the corresponding period, and determining a sum of the products determined since the start of a test cycle.

The system control module 20 may also control the chassis dynamometer 12, the ambient air blower 13, and/or the dilution air blower 36. The system control module 20 may adjust the load that the chassis dynamometer 12 applies to the wheels 24 of the vehicle 22 according to a predetermined test schedule specifying wheel load versus elapsed time of the test cycle or distance travelled during the test cycle. The system control module 20 may adjust the speed(s) of the ambient air blower 13 and/or the dilution air blower 36 according to a predetermined test schedule specifying blower speed versus elapsed time of the test cycle or distance travelled during the test cycle.

Although the vehicle test system 10 includes the exhaust sampling and analysis equipment 16, the system control module 20 may control the electronic display 30 to guide a driver in vehicle testing applications other than exhaust emissions testing. For example, the system control module 20 may control the electronic display 30 to guide a driver while testing the range of a fully electric vehicle. In such testing applications, the vehicle test system 10 may not include any emissions sampling systems such as the exhaust sampling and analysis equipment 16.

Figure 2:
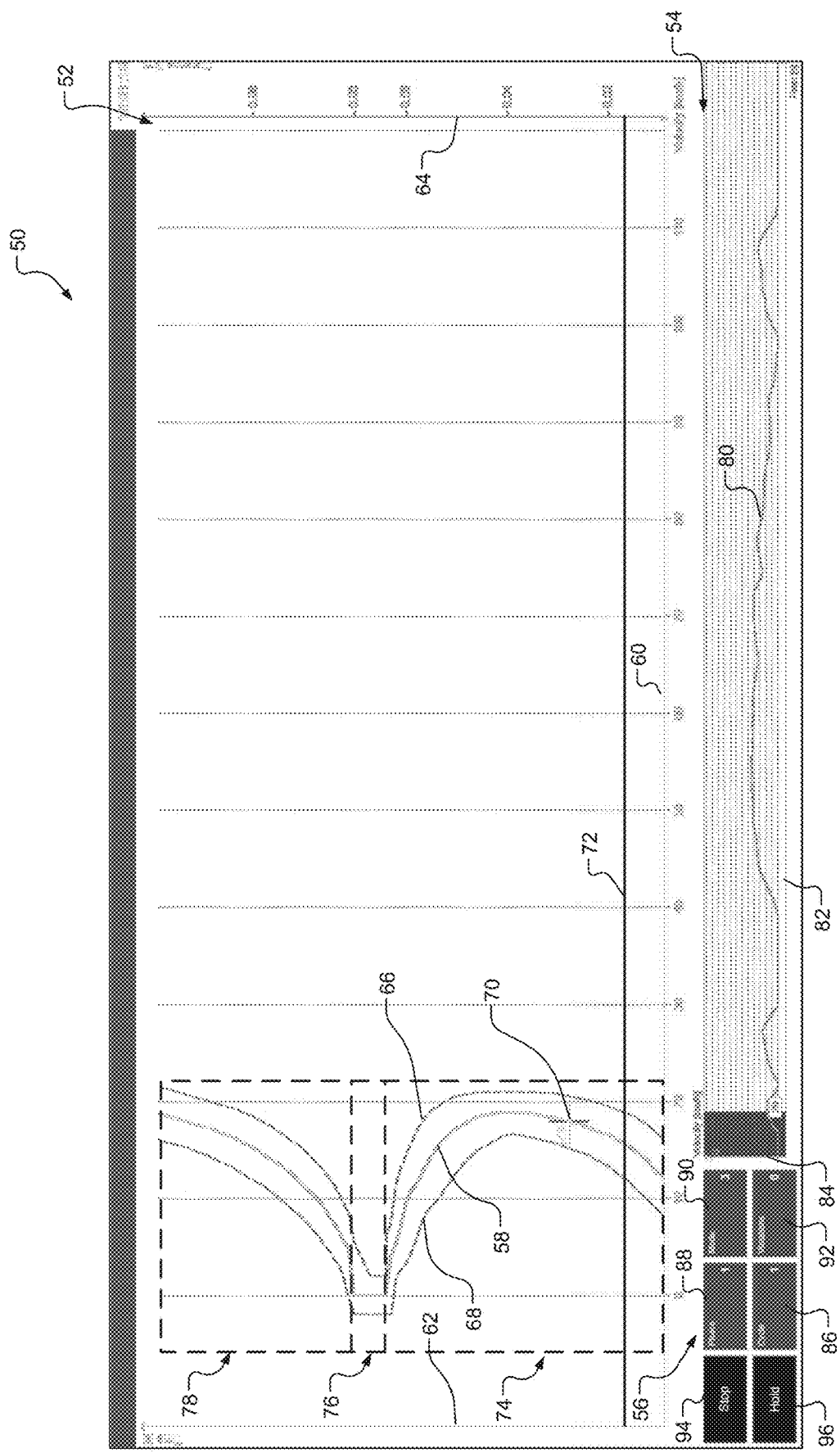
FIG. 2 illustrates an example graphical user interface (GUI) for guiding a driver when executing a test cycle that includes both a time-based portion and a distance-based portion.

FIG. 2 shows an example of a GUI 50 that may be displayed by the electronic display 30 in response to a display control signal from the system control module 20. In other words, the system control module 20 may control the electronic display 30 to display the GUI 50 and adjust the GUI 50 as described herein. The GUI 50 includes a first graph 52, a second graph 54, and test values 56. In the first graph 52, a target trace 58 is plotted with respect to an x-axis 60 that represents vehicle speed in kilometers per hour (kph), a first y-axis 62 that represents time elapsed since the start of a test cycle in seconds, and a second y-axis 64 that represents distance travelled since the start of the test cycle in kilometers. In addition, an upper limit 66 and a lower limit 68 are plotted with respect to the x-axis 60, the first y-axis 62, and the second y-axis 64. Further, a cursor 70 and a distance deviation line 72 are plotted with respect to the x-axis 60, the first y-axis 62, and the second y-axis 64.

The target trace 58 indicates the target speed of the vehicle 22 during the test cycle. The upper and lower limits 66 and 68 define a target range for the target speed of the vehicle 22 during the test cycle. The cursor 70 indicates the current or actual speed of the vehicle 22 during the test cycle. The distance deviation line 72 indicates the deviation between the actual distance travelled by the vehicle 22 during the test cycle and a target distance corresponding to the current time in the test cycle. The target distance may be determined based on a predetermined relationship between distance travelled and elapsed time (e.g., a predetermined test schedule specifying the target distance relative to the time elapsed during the test cycle).

During the test cycle, the driver controls the speed of the vehicle 22 to minimize the difference between the actual speed of the vehicle 22 and the target speed of the vehicle indicated by the target trace 58. In addition, the driver attempts to maintain the speed of the vehicle 22 between the upper and lower limits 66 and 68. The driver controls the speed of the vehicle 22 by, for example, adjusting the amount by which the driver depresses an accelerator pedal of the vehicle 22.

The test cycle includes a first distance-based portion 74, a time-based portion 76, and second distance-based portion 78. During the distance-based portions 74, 78 of the test cycle, the target speed of the vehicle 22, as well as the upper and lower limits 66 and 68, are specified relative to the distance travelled by the vehicle 22 (or the effective distance travelled by the vehicle 22 based on rotation of the wheels 24). During the time-based portion 76, the target speed of the vehicle 22, as well as the upper and lower limits 66 and 68, are specified relative to the elapsed time. The target trace 58 may be displayed in color, and the color of the target trace 58 in all of the time-based portions of the test cycle may be different than the color of the target trace 58 in all of the distance-based portions of the test cycle. For example, the color of the target trace 58 in the time-based portion 76 may be green, while the color of the target trace 58 in the distance-based portions 74, 78 may be yellow.

In the example shown in FIG. 2, the target trace 58 and the upper and lower limits 66 and 68 scroll from the top of the first graph 52 to the bottom of the first graph 52. For example, the electronic display 30 may first display only the first distance-based portion 74, then display only the time-based portion 76, and then display only the second distance-based portion 78. In other examples, the target trace 58 and the upper and lower limits 66 and 68 may scroll from the bottom of the first graph 52 to the top of the first graph 52, from the right of the first graph 52 to the left of the first graph 52, or from the left of the first graph 52 to the right of the first graph 52.

During the time-based portion 76 of the test cycle, the speed at which the target trace 58 and the upper and lower limits 66 and 68 scroll from the top of the first graph 52 to the bottom of the first graph 52 is adjusted at a constant rate. During the distance-based portions 74, 78 of the test cycle, the speed at which the target trace 58 and the upper and lower limits 66 and 68 scroll from the top of the first graph 52 to the bottom of the first graph 52 is adjusted based on the distance travelled by the vehicle 22. For example, if the wheels 24 of the vehicle 22 are at rest, the target trace 58 and the upper and lower limits 66 and 68 stop scrolling across the first graph 52. If the wheels 24 of the vehicle 22 start to rotate, the target trace 58 and the upper and lower limits 66 and 68 are scrolled from the top of the first graph 52 to the bottom of the first graph 52 by an amount corresponding to the effective distance travelled by the vehicle 22.

In addition to adjusting the speed at which the target trace 58 and the upper and lower limits 66 and 68 scroll from the top of the first graph 52 to the bottom of the first graph 52, the amount of preview trace (or look-ahead trace) may be adjusted based on the actual speed of the vehicle 22. The preview trace is a future portion of the target trace 58 (e.g., the portion of the target trace 58 between the cursor 70 and the top of the first graph 52). The amount of preview trace may be adjusted directly proportional to the actual speed of the vehicle 22. In other words, the amount of preview trace may be increased as the actual speed of the vehicle 22 increases, and the amount of preview trace may be decreased as the actual speed of the vehicle 22 decreases. For example, the lookahead trace may include only the portion of the target trace 58 between the cursor 70 and the top of time-based portion 76 if the vehicle speed is low, and the lookahead trace may include the portion of the portion of the target trace 58 between the cursor 70 and the top of the first graph 52 if the vehicle speed is high.

When adjusting the amount of the preview trace, the zoom of the first graph 52 may made smaller (or a lower percentage) to show a larger preview trace and the zoom of the first graph 52 may be made larger (or a higher percentage) to show a smaller preview trace. The system control module 20 may use smoothing techniques to ensure that adjusting the amount of the preview trace and/or the zoom of the first graph 52 is not jerky. For example, the system control module 20 may limit the rate at which the amount of the preview trace and/or the zoom of the first graph 52 is adjusted. In another example, the system control module 20 may use a first vehicle speed threshold for determining when to increase the amount of preview trace and/or decrease the zoom of the first graph 52, and use a second vehicle speed threshold for determining when to decrease the amount of preview trace and the zoom of the first graph 52. The second vehicle speed threshold may be less than the first vehicle speed threshold.

As the target trace 58 scrolls from the top of the first graph 52 to the bottom of the first graph 52, the cursor 70 moves horizontally (i.e., left and right) to indicate the actual speed of the vehicle 22. In addition, the distance deviation line 72 moves vertically (i.e., up and down) to indicate the deviation between the actual distance travelled by the vehicle 22 during the test cycle and the target distance corresponding to the current time in the test cycle. More specifically, the vertical distance between the distance deviation line 72 and the cursor 70 is directly proportional to the amount of error accumulated in distance since the start of the test cycle. The purpose of the distance deviation line 72 is to show the driver if the vehicle is falling behind or driving ahead of the specified distance profile, and by how much. In the example shown, the distance deviation line 72 is disposed below the cursor 70. However, the distance deviation line 72 may be disposed above the cursor 70.

In the second graph 54, a target trace 80 is plotted with respect to an x-axis 82 that represents time in seconds and a y-axis 84 that represents vehicle speed in kph. While the target trace 58 of the first graph 52 may correspond to only a small portion of the overall test cycle, the target trace 80 of the second graph 54 may correspond to the entire test cycle, including portions that are distance-based and portions that are time-based. The driver may view the target trace 58 to understand what lies ahead for the time-based portions of the test cycle.

The test values 56 include a current test cycle 86, a current test phase 88 of the current test cycle 86, a current test mode 90 of the current test cycle 86, and a number of violations 92 during the current test cycle 86. The number of violations 92 is the number of times that the actual speed of the vehicle 22 is outside of the target range defined by the upper and lower limits 66 and 68 during the current test cycle 86. The GUI 50 may also include a stop indicator 94 that instructs the driver to stop the vehicle 22 when illuminated, and a hold indicator 96 that instructs the driver to hold the speed of the vehicle 22 at the current speed when illuminated.

Figure 3:
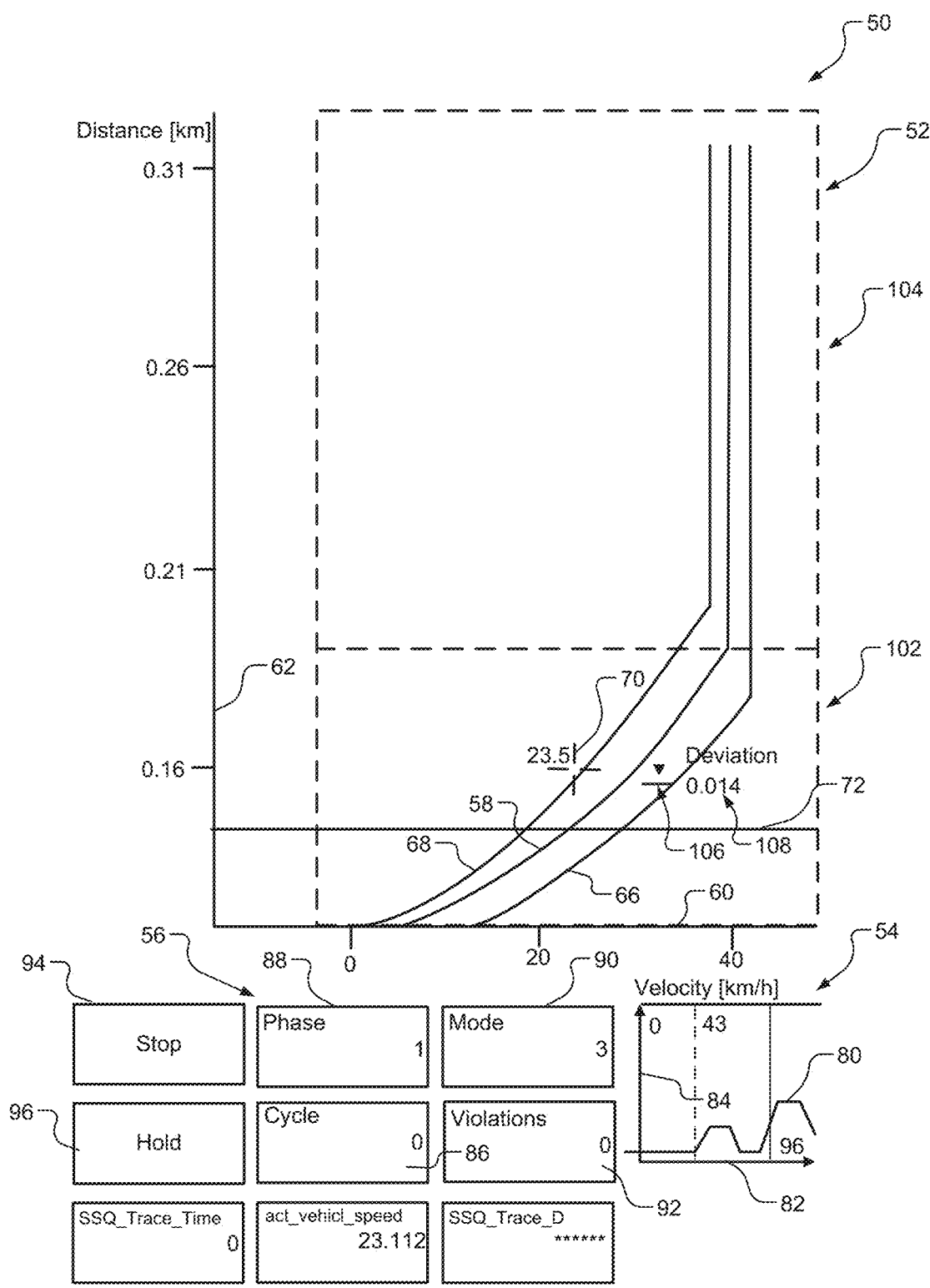
FIG. 3 illustrates another example GUI for guiding a driver when executing a test cycle that includes both a time-based portion and a distance-based portion.

In FIG. 3, the first graph 52 illustrates a distance-based portion 102 of a test cycle and a time-based portion 104 of the test cycle. In addition, in the first graph 52, a distance deviation arrow 106 and a distance deviation value 108 are displayed adjacent to the cursor 70. The distance deviation line 72, the distance deviation arrow 106, and the distance deviation value 108 may be referred to collectively as distance deviation indicators. The distance deviation arrow 106 indicates whether the actual distance travelled by the vehicle 22 during the test cycle is ahead or behind the target distance. For example, when the distance deviation arrow 106 is pointing downward as shown in FIG. 3, the actual distance travelled by the vehicle 22 during the test cycle may be behind the target distance. In contrast, if the distance deviation arrow 106 is pointing upward, the actual distance travelled by the vehicle 22 during the test cycle may be ahead of the target distance. The distance deviation value 108 indicates the amount by which the actual distance travelled by the vehicle 22 during the test cycle is ahead or behind the target distance. The distance deviation value 108 may be specified in kilometers or miles.

Figure 4:
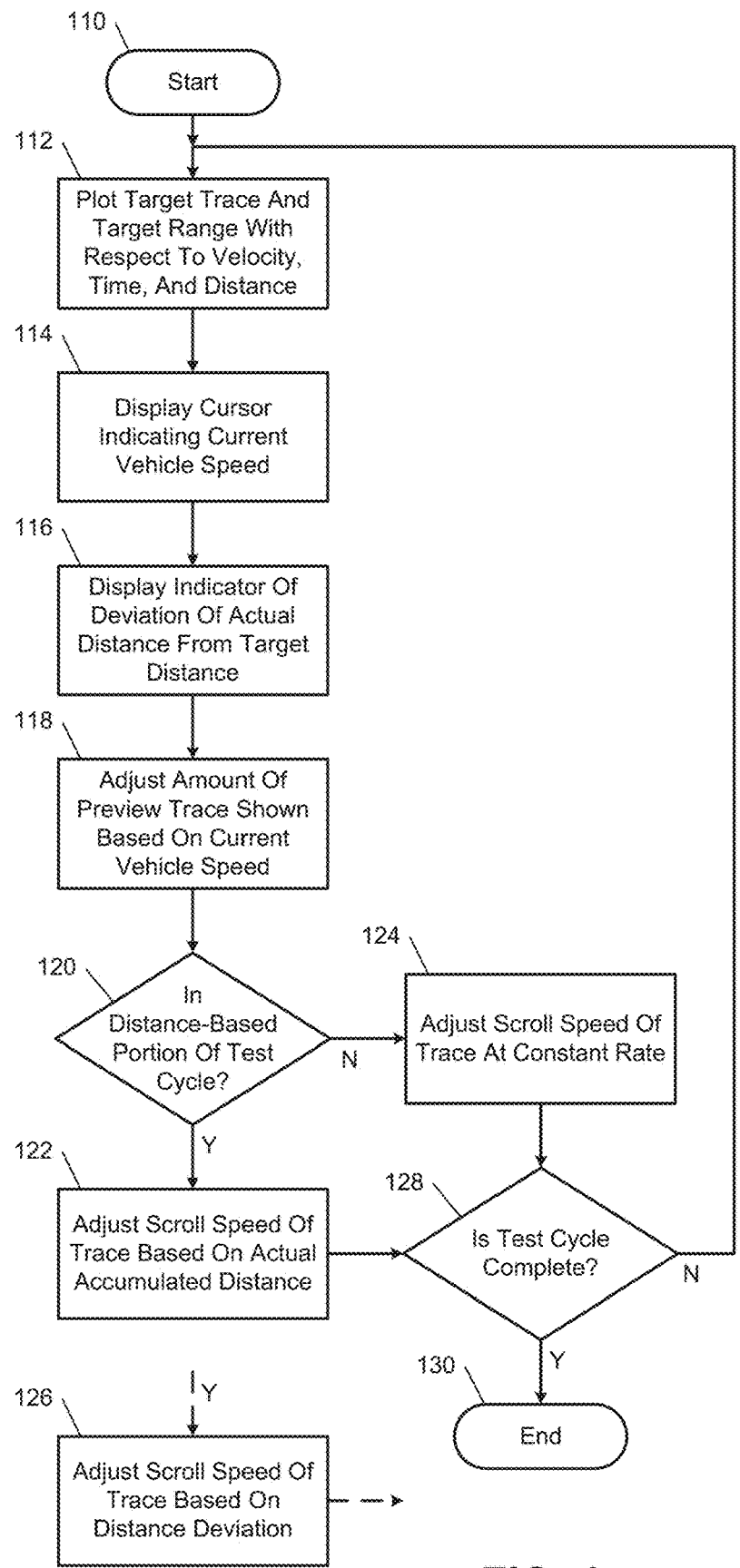
FIG. 4 is a flowchart illustrating an example method for controlling an electronic display to guide a driver when executing a test cycle that includes both a time-based portion and a distance-based portion.

Referring now to FIG. 4, an example method for controlling the electronic display 30 to guide the driver of the vehicle 22 when executing a test cycle that includes a time-based portion and a distance-based portion begins at 110. The system control module 20 may control the electronic display 30 to perform one or more (e.g., all) of the steps of the method of FIG. 4. At 122, the electronic display 30 plots a graph illustrating a target trace and a target range with respect to axes representing vehicle velocity (or speed), time elapsed during the test cycle, and the effective distance travelled by the vehicle 22 during the test cycle. For example, the electronic display 30 may plot the first graph 52 illustrating the target trace 58 and the target range defined by the upper and lower limits 66 and 68 with respect to the x-axis 60, the first y-axis 62, and the second y-axis 64.

At 114, the electronic display 30 displays a cursor indicating the current vehicle speed with respect to the aforementioned axes. For example, the electronic display 30 may display the cursor 70 with respect to the x-axis 60, the first y-axis 62, and the second y-axis 64. At 116, the electronic display 30 displays an indicator of the deviation of the actual distance travelled by the vehicle 22 during the test cycle from the target distance. For example, the electronic display 30 may display the distance deviation line 72, the distance deviation arrow 106, and/or the distance deviation value 108. At 118, the electronic display 30 adjusts the amount of preview trace shown based on the current (or actual) speed of the vehicle 22. For example, as discussed above, the electronic display 30 may increase the amount of preview trace shown when the current vehicle speed increases, and the electronic display 30 may decrease the amount of preview trace shown when the current vehicle speed decreases.

At 120, the system control module 20 determines whether the current point in the test cycle corresponds to a distance-based portion of the test cycle such as the distance-based portions 74, 78 of FIG. 2 or the distance-based portion 102 of FIG. 3. If the current point in the test cycle corresponds to a distance-based portion of the test cycle, the method continues at 122. Otherwise, the method continues at 124. At 122, the electronic display 30 adjusts the scroll speed of the target trace from a first side (e.g., the top side) of the graph to a second side (e.g., the bottom side) of the graph based on the actual accumulated distance (or actual distance travelled) by the vehicle 22. In various implementations, the method may perform 126 instead of 122. At 124, the electronic display 30 adjusts the scroll speed of the target trace from the first side of the graph to the second side of the graph at a constant rate. The constant rate may be predetermined.

At 126, the electronic display 30 adjusts the scroll speed of the target trace from the first side of the graph to the second side of the graph based on the deviation of the actual distance travelled by the vehicle 22 during the test cycle from the target distance. In one example, if the driver of the vehicle 22 precisely follows a predefined profile of distance versus time, the scroll speed of the target trace from the first side of the graph to the second side of the graph is constant. If the driver increases the actual vehicle speed above the target vehicle speed such that the vehicle 22 accumulates distance faster than expected for the current point in the test cycle, then the scroll speed of the target trace increases. If the driver decreases the actual vehicle speed below the target vehicle speed such that the vehicle 22 accumulates distance slower than expected for the current point in the test cycle, then the scroll speed of the target trace decreases. In this manner, adjusting the scroll speed of the target trace forces the driver to adjust the actual speed of the vehicle 22 to reduce the distance deviation.

The system control module 20 may use smoothing techniques to ensure that adjusting the scroll speed of the target trace is not jerky. For example, the system control module 20 may limit the rate at which the scroll speed of the target trace is adjusted. In another example, the system control module 20 may use a first distance deviation threshold for determining when to increase the scroll speed of the target trace, and use a second distance deviation threshold for determining when to decrease the scroll speed of the target trace. The second distance deviation threshold may be less than the first distance deviation threshold.

At 128, the system control module 20 determines whether the test cycle is complete. For example, the system control module 20 may determine whether the vehicle 22 has been driven through all of the time-based portions of the test cycle and all of the distance-based portions of the test cycle. If the test cycle is complete, the method ends at 130. Otherwise, the method returns to 112.

In the examples described above, the test cycle includes both a time-based portion and a distance-based portion. However, various control techniques described herein may be implemented in conjunction with a test cycle that is only time-based or only distance-based. For example, during a test cycle that is only time-based or only distance-based, the system control module 20 may control the electronic display 30 to adjust the amount of preview trace shown based on the actual vehicle speed as described above. In another example, during a test cycle that is only time-based or only distance-based, the system control module 20 may control the electronic display 30 to display an indicator of the deviation of the actual distance travelled by the vehicle 22 from the target distance as described above.

FIGS. 5 through 8 show another example of a GUI 132 that may be displayed by the electronic display 30 in response to a display control signal from the system control module 20. In other words, the system control module 20 may control the electronic display 30 to display the GUI 132 and adjust the GUI 132 as described herein. The GUI 132 includes a first graph 134, a second graph 136, a first set of test values 138, a road gradient scale 140, and a second set of test values 142. In the first graph 134, a target trace 144 is plotted with respect to an x-axis 146 that represents vehicle speed in kph and a y-axis 148 that represents time elapsed since the start of a test cycle in seconds. In addition, an upper limit 150, lower limit 152, and a cursor 154 are plotted with respect to the x-axis 146 and the y-axis 148. Further, a fill 156 is displayed in the space between the upper and lower limits 150 and 152.

The target trace 144 indicates the target speed of the vehicle 22 during the test cycle. The upper and lower limits 150 and 152 define a target range for the target speed of the vehicle 22 during the test cycle. The cursor 154 indicates the current or actual speed of the vehicle 22 during the test cycle.

The fill 156 indicates the gradient of the road on which the vehicle 22 is travelling. In this regard, the fill 156 may be referred to as a road gradient indicator. In the example shown in FIGS. 5 through 8, the fill 156 is a color fill, where the color of the fill 156 changes as the road gradient changes. In other examples, such as the one discussed below with respect to FIG. 13, the fill 156 may be another type of fill such as symbols (e.g., arrows, hash marks), where the concentration of the indicators changes as the road gradient changes.

The road gradient scale 140 indicates the road gradient (in percentage) that corresponds to the color of the fill 156. Positive values on the road gradient scale 140 indicate an uphill gradient, while negative values on the road gradient scale 140 indicate a downhill gradient. In the example shown, positive values are represented by the color blue and negative values are represented by the color purple. In addition, the fade or intensity of the color indicates the percentage of the road gradient. More faded colors correspond to lower percentages of road gradient, while less faded colors correspond to higher percentages of road gradient. In various implementations, colors other than blue and purple may be used. For example, positive values may be represented by the color orange and negative values may be represented by the color green.

During the test cycle, a driver controls the speed of the vehicle 22 to minimize the difference between the actual speed of the vehicle 22 and the target speed of the vehicle indicated by the target trace 144. In addition, the driver attempts to maintain the speed of the vehicle 22 between the upper and lower limits 150 and 152. The fill 156 helps the driver accomplish this, as the driver can use the fill 156 to anticipate changes in road gradient and adjust the position of the accelerator pedal accordingly.

Figure 5:
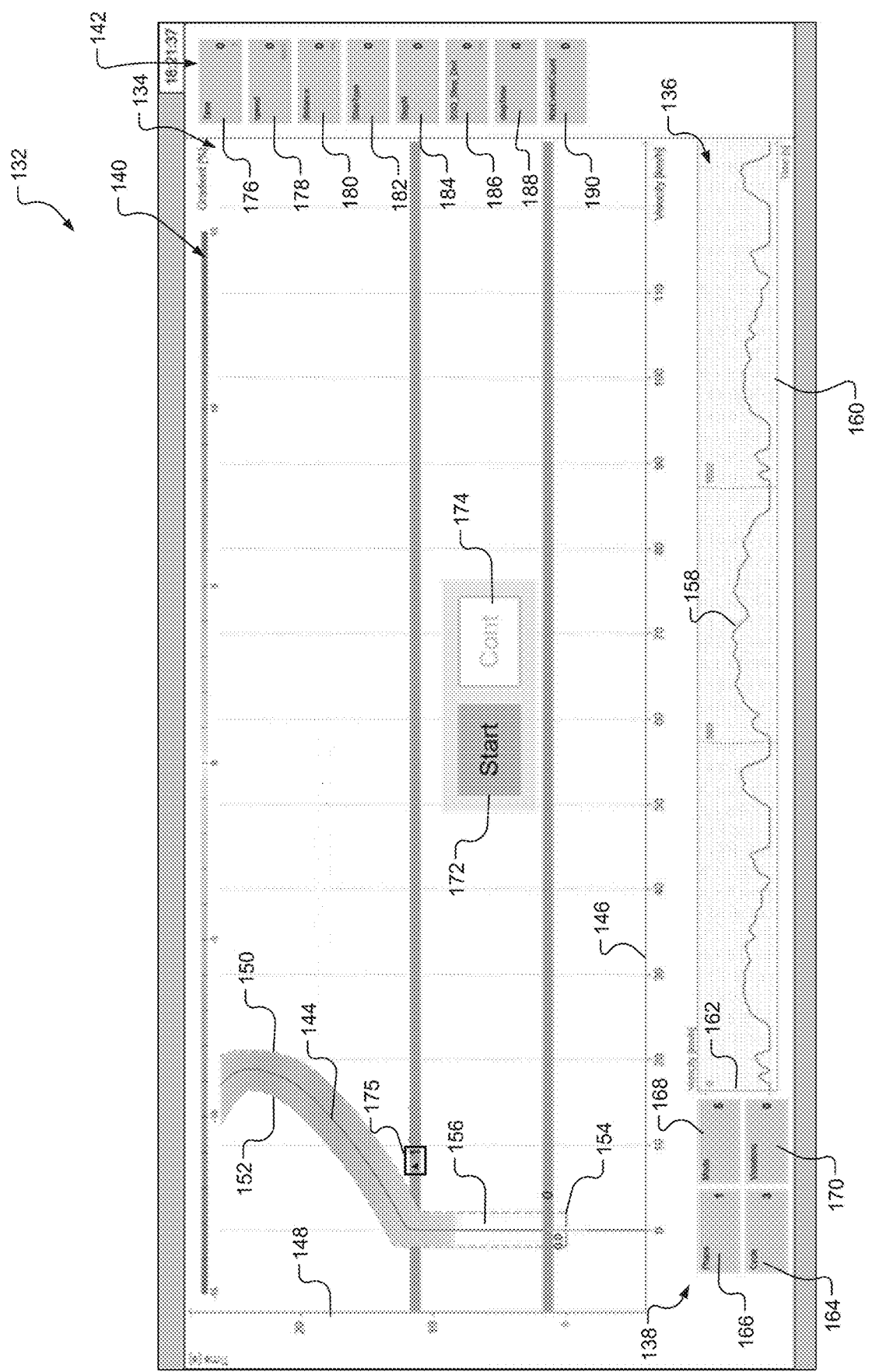
FIGS. 5 through 8 illustrate an example GUI for guiding a driver when executing a test cycle, where the GUI includes a road gradient indicator in color and indicators of upper and lower limits on a target vehicle speed.
Figure 6:
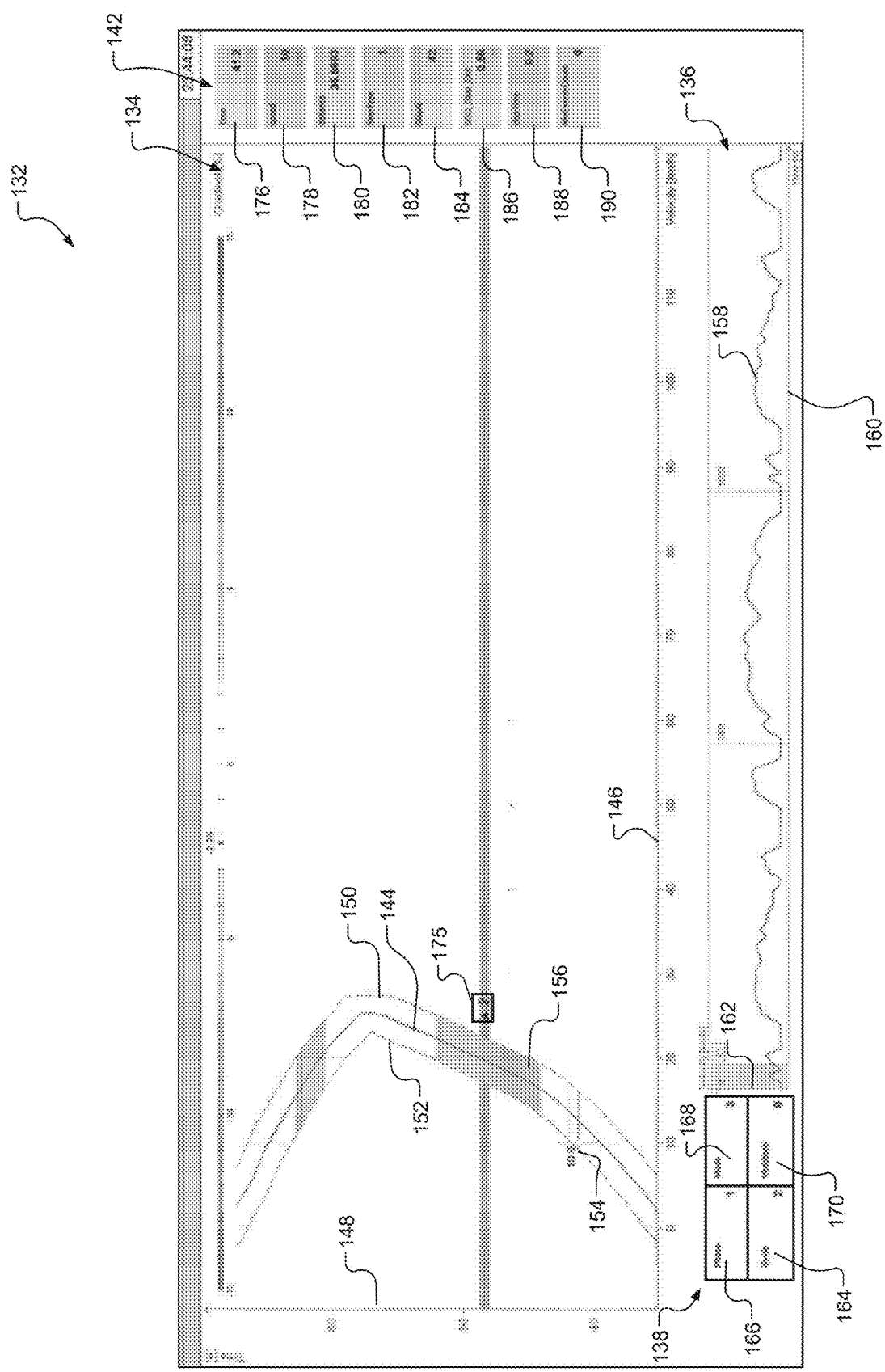

FIGS. 5 through 8 correspond to different time windows of the test cycle and different distance-travelled windows of the test cycle. For example, in FIG. 5, the y-axis 148 spans from a time of 0 seconds to a time of about 25 seconds. Thus, FIG. 5 corresponds to the first ~25 seconds of the test cycle. In addition, the position of the cursor 154 in FIG. 5 corresponds to a vehicle speed of 0 kph, a time of 0 seconds, and a vehicle position (i.e., distance travelled since the start of the test cycle) of 0 meters. In FIG. 6, the y-axis 148 spans from a time of about 35 seconds to a time of about 68 seconds. In addition, the position of the cursor 154 in FIG. 5 corresponds to a vehicle speed of 10 kph, a time of about 41 seconds, and a vehicle position of about 37 meters.

Figure 7:
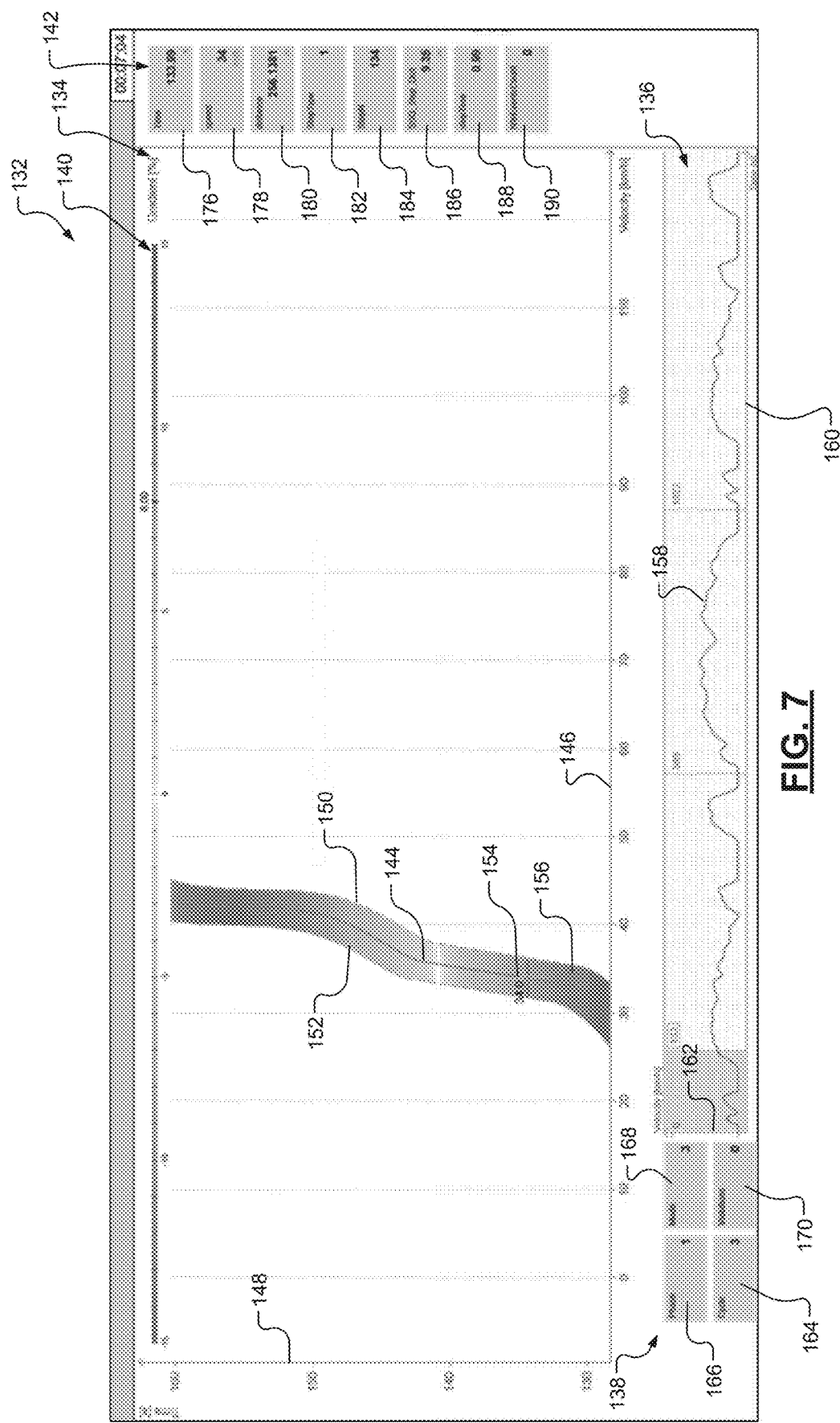
Figure 8:
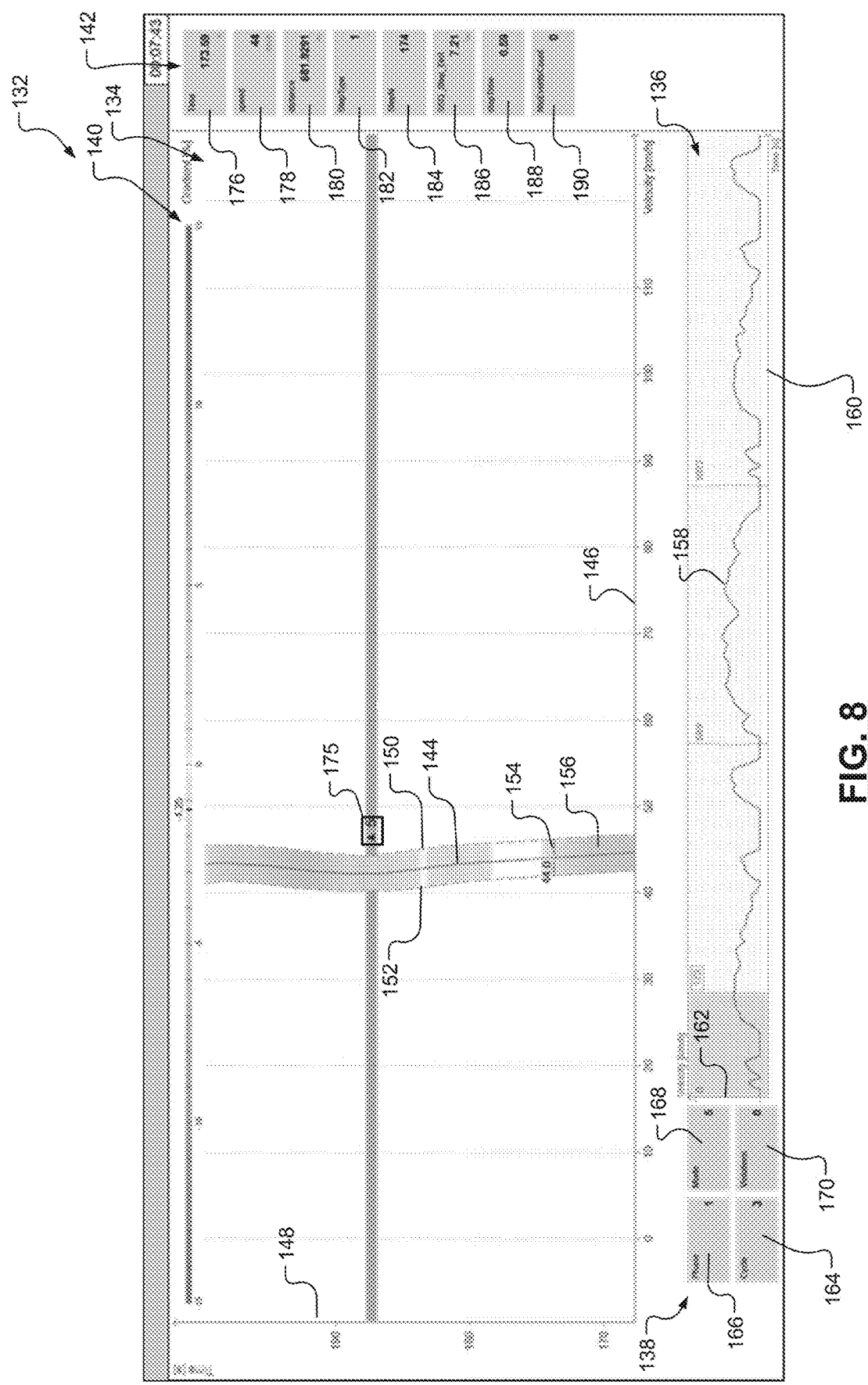
Figure 9:
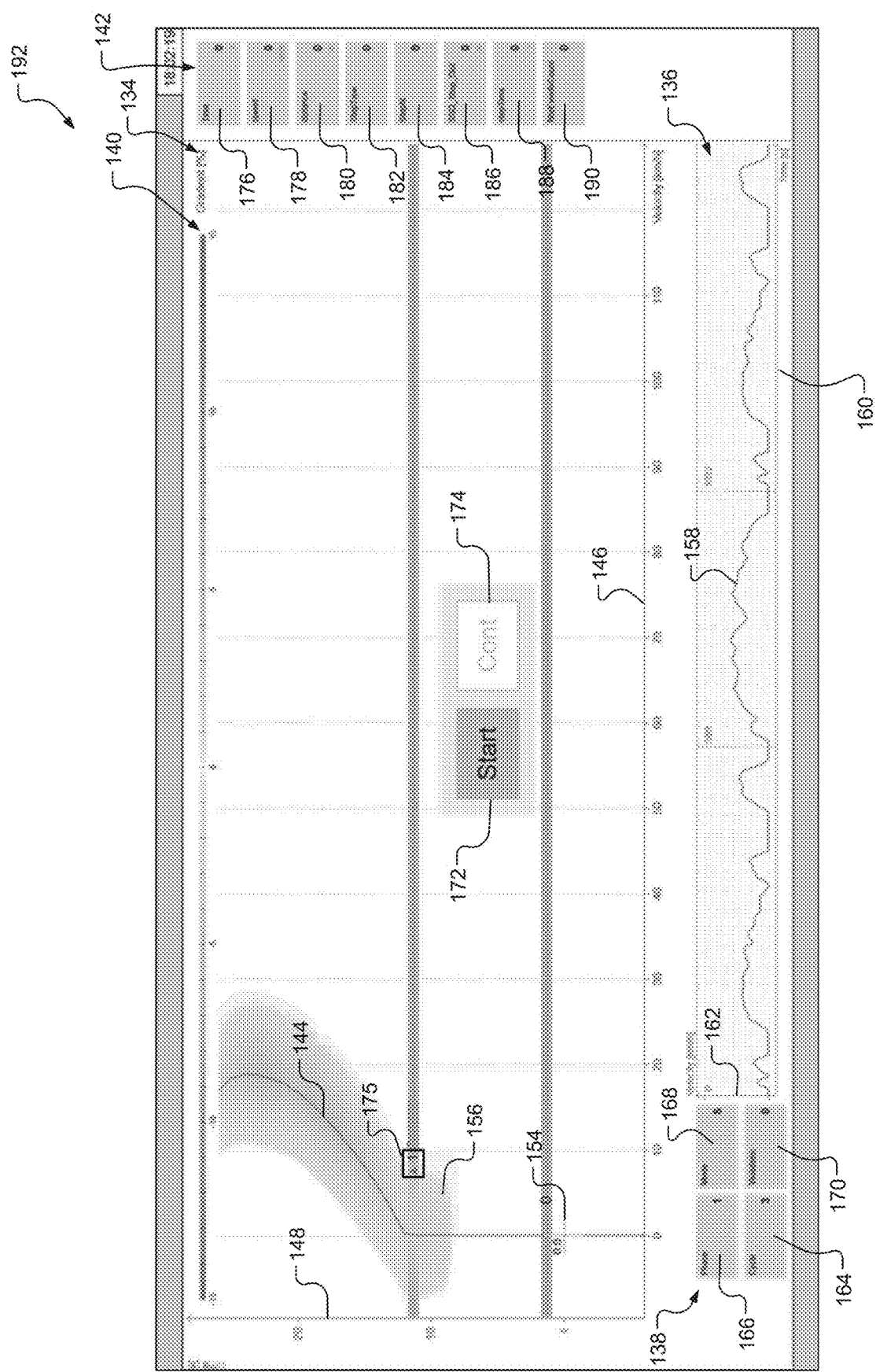
FIGS. 9 through 12 illustrate an example GUI for guiding a driver when executing a test cycle, where the GUI includes a road gradient indicator in color without upper and lower speed limit indicators.
Figure 10:
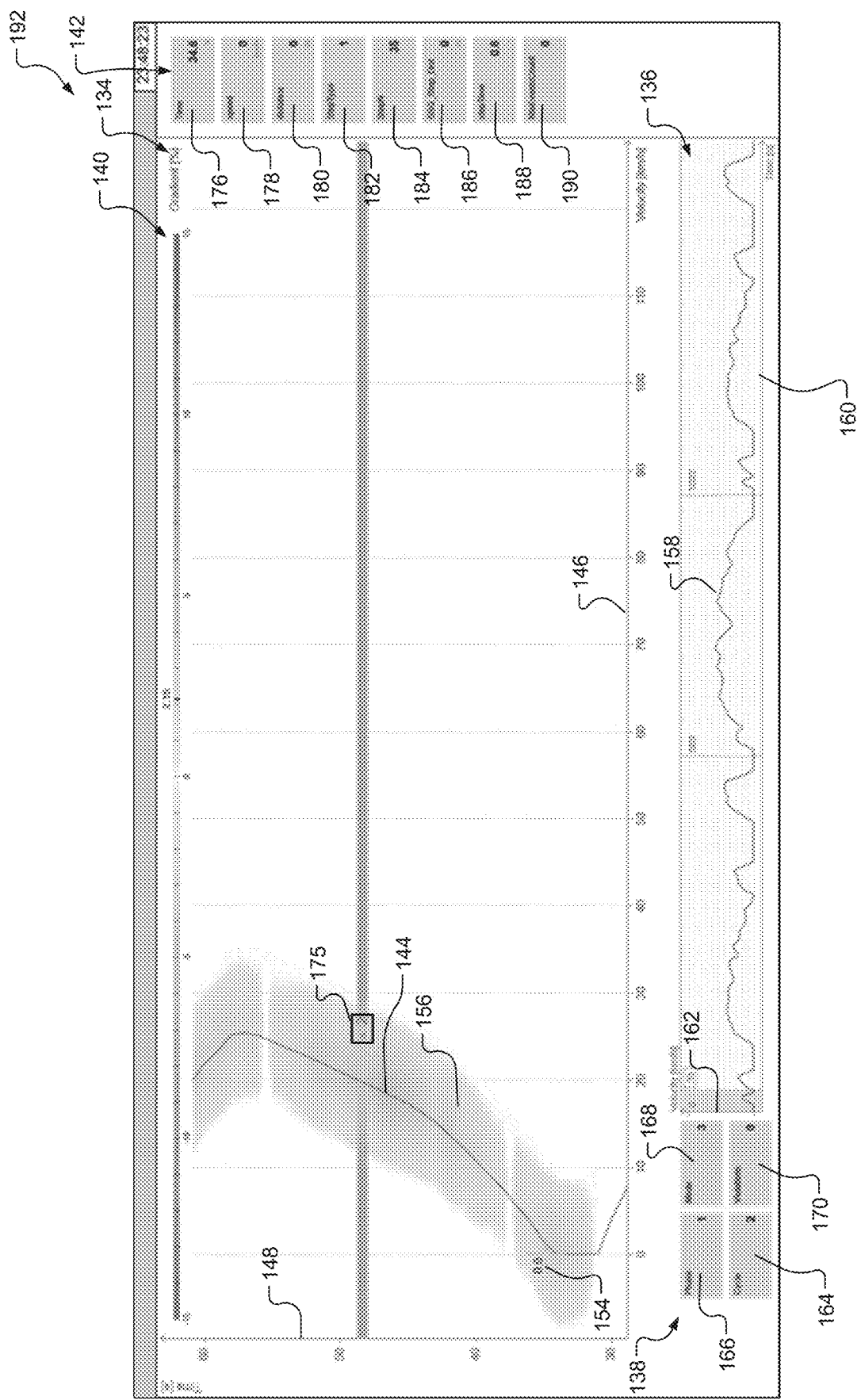
Figure 11:
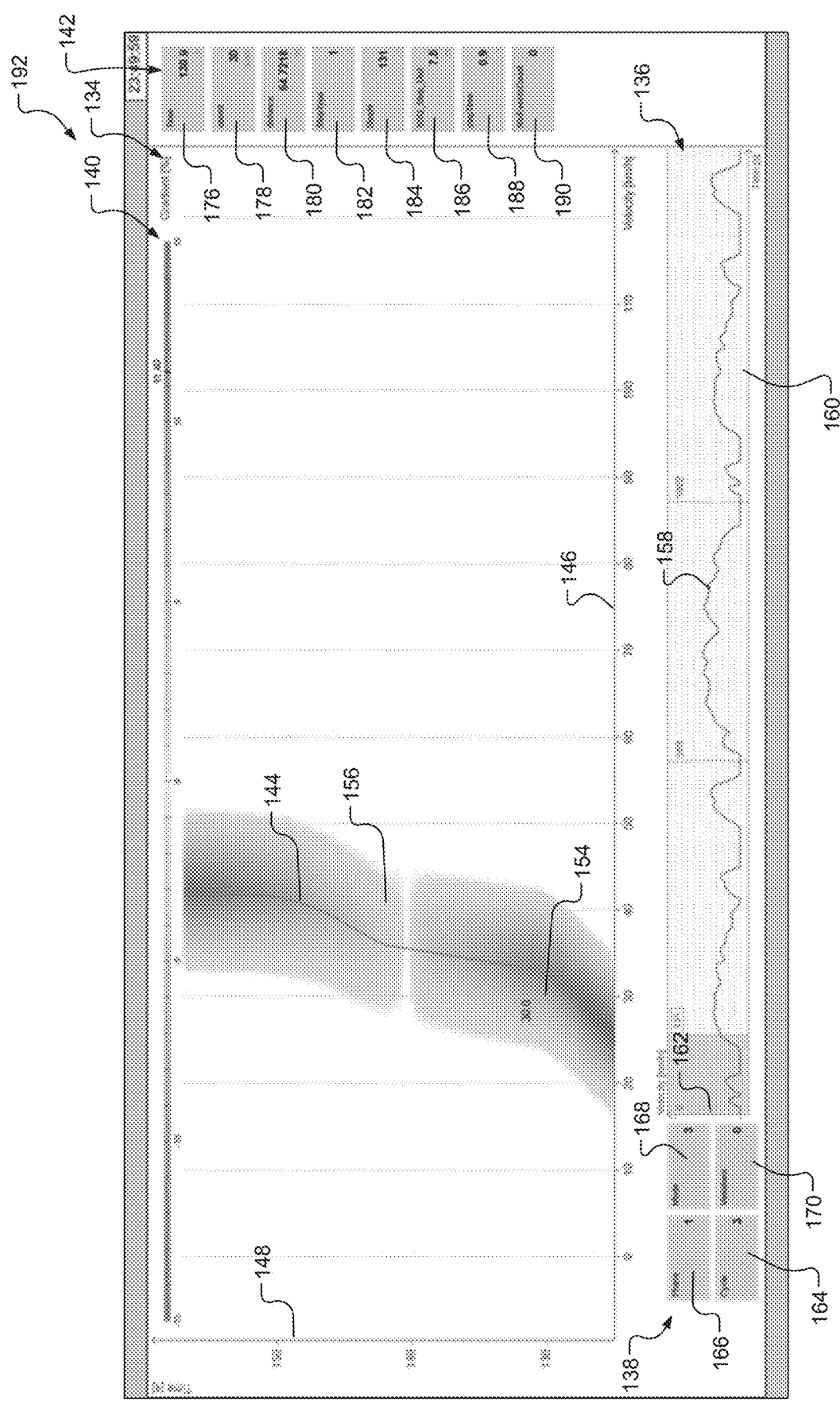
Figure 12:
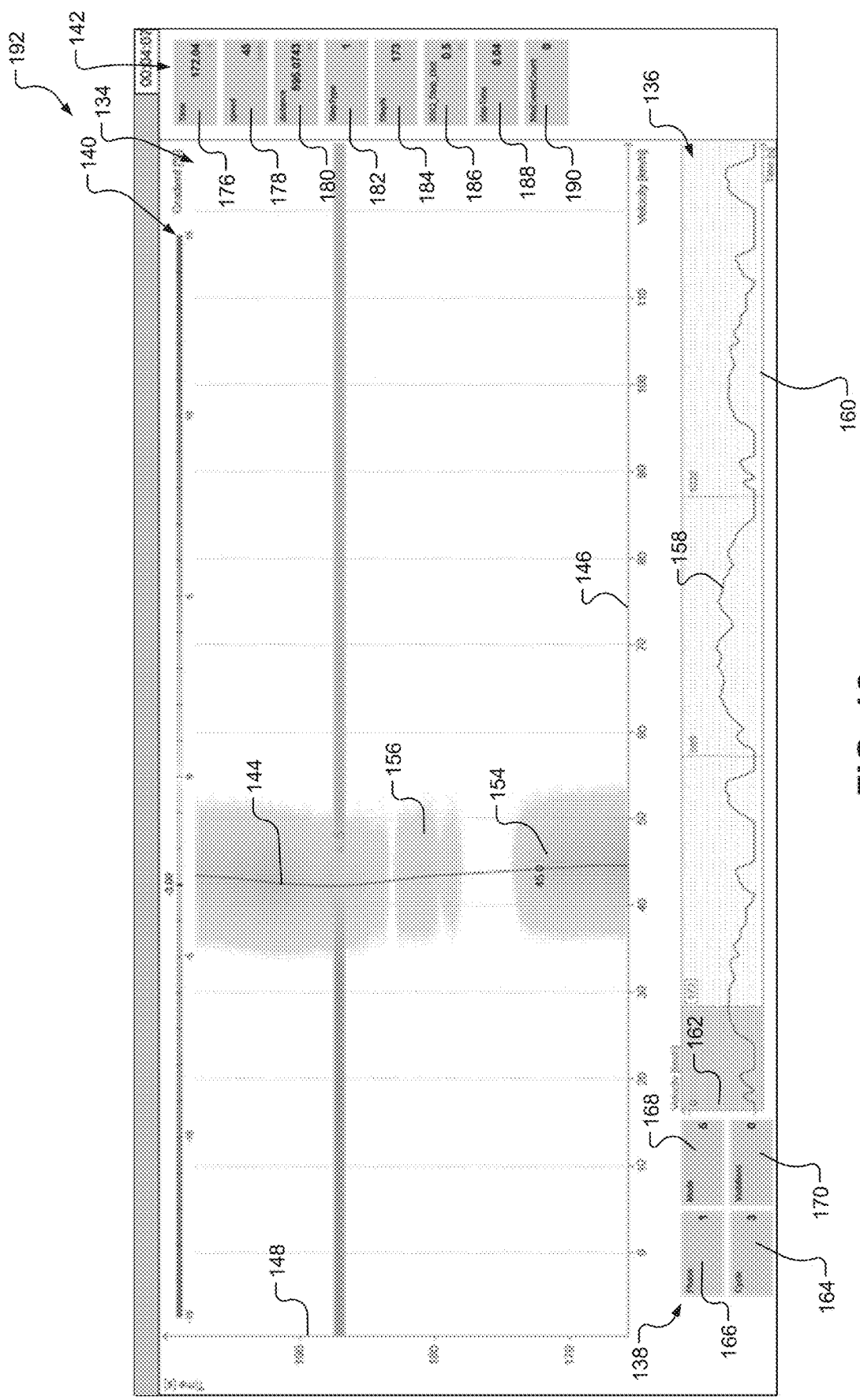

In FIG. 7, the y-axis 148 spans from a time of about 128 seconds to a time of about 162 seconds. In addition, the position of the cursor 154 in FIG. 7 corresponds to a vehicle speed of 34 kph, a time of about 134 seconds, and a vehicle position of about 256 meters. In FIG. 8, the y-axis 148 spans from a time of about 168 seconds to a time of about 200 seconds. In addition, the position of the cursor 154 in FIG. 7 corresponds to a vehicle speed of 44 kph, a time of about 174 seconds, and a vehicle position of about 682 meters. Although FIGS. 5 through 8 are depicted as time-based portions, the fill 156 may be used in connection with distance-based portions in a similar manner.

In the example shown in FIGS. 5 through 8, the target trace 144, the upper and lower limits 150 and 152, and the fill 156 scroll from the top of the first graph 134 to the bottom of the first graph 134. For example, the electronic display 30 may first display only the portion of the first graph 134 shown in FIG. 5, then display only the portion of the first graph 134 shown in FIG. 6, then display only the portion of the first graph 134 shown in FIG. 7, and then display only the portion of the first graph 134 shown in FIG. 8. In other examples, the target trace 144 and the upper and lower limits 150 and 152 may scroll from the bottom of the first graph 134 to the top of the first graph 134, from the right of the first graph 134 to the left of the first graph 134, or from the left of the first graph 134 to the right of the first graph 134. As the target trace 144 scrolls from the top of the first graph 134 to the bottom of the first graph 134, the cursor 154 moves horizontally (i.e., left and right) to indicate the actual speed of the vehicle 22.

In FIG. 5, the fill 156 is white between a time of zero seconds and a time of about 8 seconds, and the road gradient scale 140 indicates that a white fill corresponds to a road gradient of zero. Therefore, the road gradient is zero for the first 8 seconds of the test cycle. The fill 156 gradually changes from a more faded blue to a less faded blue from a time of about 10 seconds to a time of about 20 seconds, and the road gradient scale 140 indicates that the more faded blue fill corresponds to a road gradient of about two percent while the less faded blue fill corresponds to a road gradient of about six percent. Therefore, the road gradient increases from about two percent to about six percent for the second ten-second interval of the test cycle. In FIG. 6, the fill 156 is white during a first period from a time of about 35 seconds to a time of about 45 seconds, purple during a second period from the time of about 45 seconds to a time of about 52 seconds, white during a third period from the time of about 52 seconds to a time of about 60 seconds, blue during a fourth period from the time of about 60 seconds to a time of about 63 seconds, and white during a fifth period from the time of about 63 seconds to a time of about 68 seconds. Thus, the road gradient is zero during the first, third, and fifth periods, a negative value during the second period, and a positive value during the fourth period.

In FIG. 7, the fill 156 is blue during a sixth period from a time of about 128 seconds to a time of about 141 seconds, white during a seventh period from the time of about 141 seconds to a time of about 142 seconds, and purple during an eighth period from the time of about 142 seconds to a time of about 162 seconds. Thus, the road gradient is a positive value during the sixth period, zero during the seventh period, and a negative value during the eighth period. In addition, the fill 156 changes from a less faded blue at the beginning of the sixth period to a more faded blue at the end of the sixth period, and the fill 156 changes from a more faded purple at the beginning of the eighth period to a less faded purple at the end of the eighth period. Thus, the road gradient decreases from a higher positive value to a lower positive value during the sixth period, and the road gradient decreases from a lower negative value to a higher negative value during the eighth period.

In FIG. 8, the fill 156 is purple during a ninth period from a time of about 168 seconds to a time of about 175 seconds, white during a tenth period from the time of about 175 seconds to a time of about 178 seconds, blue during an eleventh period from the time of about 178 seconds to a time of about 183 seconds, white during a twelfth period from the time of about 183 seconds to a time of about 185 seconds, and purple during a thirteenth period from the time of about 185 seconds to a time of about 200 seconds. Thus, the road gradient is a negative value during the ninth and thirteenth periods, zero during the tenth and twelfth periods, and a positive value during the eleventh period. In addition, the fill 156 changes from a less faded purple at the beginning of the ninth period to a more faded purple at the end of the ninth period, and the fill 156 changes from a more faded purple at the beginning of the thirteenth period to a less faded purple at the end of the thirteenth period. Thus, the road gradient increases from a higher negative value to a lower negative value during the ninth period, and the road gradient decreases from a lower negative value to a higher negative value during the thirteenth period.

In the second graph 136, a target trace 158 is plotted with respect to an x-axis 160 that represents time in seconds and a y-axis 162 that represents vehicle speed in kph. While the target trace 144 of the first graph 134 may correspond to only a small portion of the overall test cycle, the target trace 158 of the second graph 136 may correspond to the entire test cycle. The driver may view the target trace 144 to observe the target vehicle speed profile outside of the time window shown in the first graph 134.

The first set of test values 138 includes a current test cycle 164, a current test phase 166 of the current test cycle 164, a current test mode 168 of the current test cycle 164, and a number of violations 170 during the current test cycle 164. The number of violations 170 is the number of times that the actual speed of the vehicle 22 is outside of the target range defined by the upper and lower limits 150 and 152 during the current test cycle 164. As shown in FIG. 5, the GUI 132 may also include a start indicator 172 that instructs the driver to start moving the vehicle 22 when illuminated, and a continue indicator 174 that instructs the driver to continue or resume moving the vehicle 22 when illuminated. The start indicator 172 may double as a stop indicator by, for example, replacing the text "Start" with the text "Stop" and instructing the driver to stop when illuminated.

In addition, as shown in FIG. 5, the GUI 132 may include a shift indicator 175 that indicates whether the driver should upshift or downshift and the current gear of the vehicle 22. More specifically, the shift indicator 175 includes either an up arrow or a down arrow, along with a number. The up arrow indicates that the driver should upshift. The down arrow indicates that the driver should downshift. The number indicates the current gear of the vehicle 22.

With continued reference to FIGS. 5 through 8, the second set of test values 142 includes a time 176 that has elapsed since the start of the current test cycle 164, a current speed 178 of the vehicle 22, and a distance 180 travelled by the vehicle 22 since the start of the current test cycle 164. The second set of test values 142 further includes a step type 182, a current step 184, a step distance 186, a step time 188, and a not-to-exceed (NTE) event count 190. The NTE event count 190 represents the number of times that a level of emissions produced by the engine of the vehicle 22 exceeded a predetermined level during the current test cycle 164. In various implementations, one or more (e.g., all) of the first and second sets of test values 138 and 142 may be omitted from the GUI 132.

FIGS. 9 through 12 show another example of a GUI 192 that may be displayed by the electronic display 30 in response to a display control signal from the system control module 20. In other words, the system control module 20 may control the electronic display 30 to display the GUI 192 and adjust the GUI 192 as described herein. The representations of the GUI 192 in FIGS. 9 through 12 are substantially similar to the representations of the GUI 132 in FIGS. 5 through 8, respectively. Therefore, only differences between the GUIs 132, 192 will now be described.

The first graph 134 of the GUI 192 does not include indicators of upper and lower limits such as the upper and lower limits 150 and 152 of the GUI 132, or even an abrupt change between the fill 156 and areas of the first graph 134 to the right and left of the fill 156. Instead, the fill 156 fades in the horizontal direction. While the fading of the fill 156 in the direction of the target trace 144 indicates a change in the magnitude of the road gradient, the fading of the fill 156 in the horizontal direction does not indicate such a change. Rather, the fill 156 is gradually faded to white in the horizontal directions on both sides of the target trace 144 so that, without indicators of the upper and lower limits, the entire first graph 134 is not full of the grade indication color that may be distracting to the driver.

Figure 13:
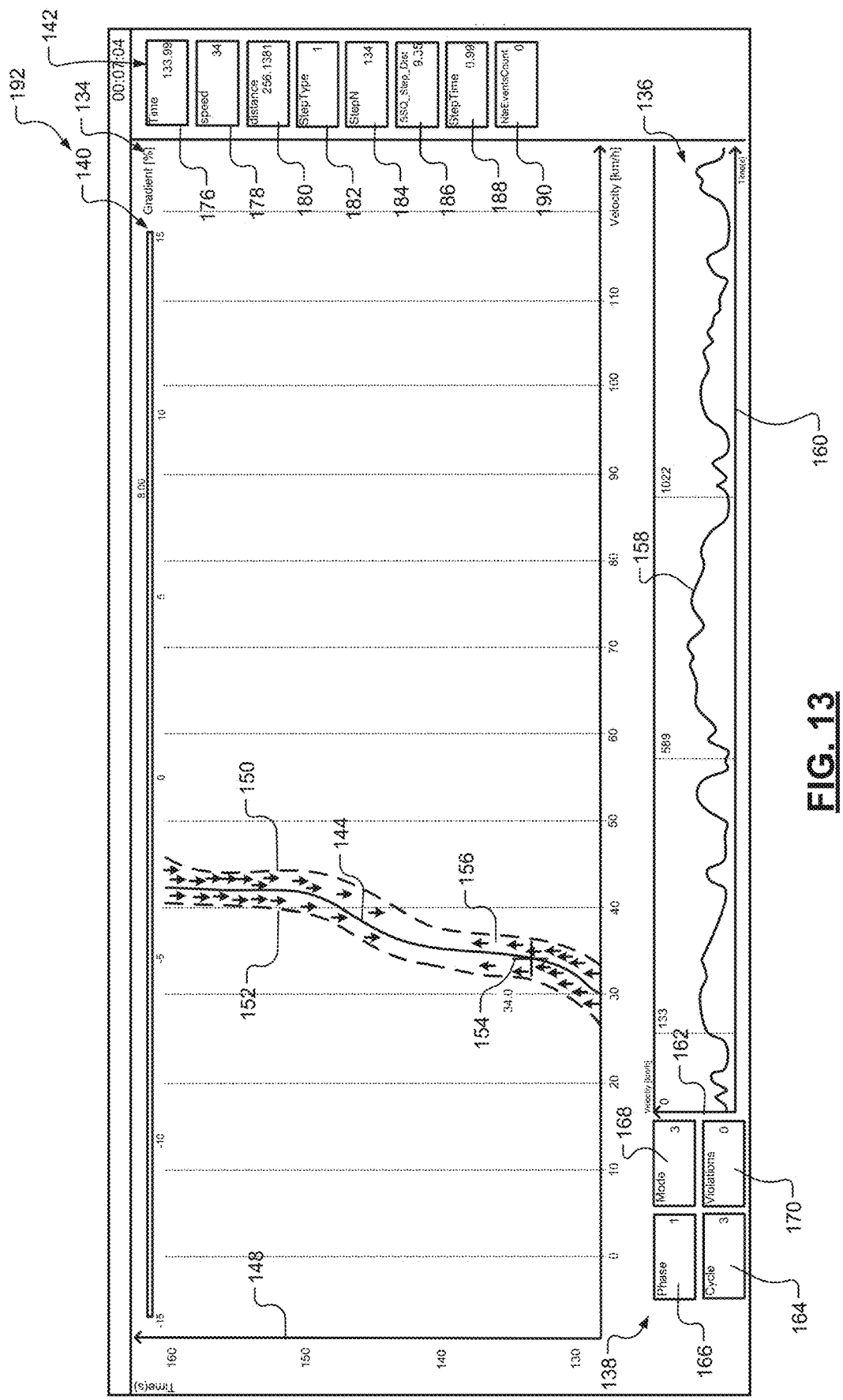
FIG. 13 illustrates an example GUI for guiding a driver when executing a test cycle, where the GUI includes a road gradient indicator in the form of a symbol.

FIG. 13 shows another example of a GUI 194 that may be displayed by the electronic display 30 in response to a display control signal from the system control module 20. In other words, the system control module 20 may control the electronic display 30 to display the GUI 194 and adjust the GUI 194 as described herein. The representation of the GUI 194 in FIG. 13 is substantially similar to the representation of the GUI 132 in FIG. 7. Therefore, only differences between the GUIs 132, 194 will now be described.

While the GUI 132 includes elements in color, all of the element of the GUI 194 are in black and white. Thus, the fill 156 in the first graph 134 of the GUI 194 is not a color fill as it is in the first graph 134 of the GUI 132. Rather, the fill 156 in the first graph 134 of the GUI 194 is a plurality of arrows. The arrows pointing upward indicate an uphill road gradient, and the arrows pointing downward indicate a downhill road gradient. In addition, the concentration of the arrows indicates the percentage of the road gradient, with a higher concentration of arrows corresponding to a higher percentage and a lower concentration of arrows corresponding to a lower percentage.

In FIG. 13, the fill 156 includes up arrows during the sixth period from the time of about 128 seconds to the time of about 141 seconds, no arrows during the seventh period from the time of about 141 seconds to the time of about 142 seconds, and down arrows during the eighth period from the time of about 142 seconds to the time of about 162 seconds. Thus, the road gradient is a positive value during the sixth period, zero during the seventh period, and a negative value during the eighth period. In addition, the fill 156 changes from a higher concentration of up arrows at the beginning of the sixth period to a lower concentration of up arrows at the end of the sixth period, and the fill 156 changes from a lower concentration of down arrows at the beginning of the eighth period to a higher concentration of down arrows at the end of the eighth period. Thus, the road gradient decreases from a higher positive value to a lower positive value during the sixth period, and the road gradient decreases from a lower negative value to a higher negative value during the eighth period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for providing a visual aid to guide a driver of a vehicle when executing a test cycle that includes a time-based portion and a distance-based portion, the method comprising controlling an electronic display to:
   display a graph including a target trace indicating a target speed of the vehicle during the test cycle and a first visual indicator of an actual speed of the vehicle during the test cycle, the target trace being plotted with respect to a first axis indicating speed, a second axis indicating time, and a third axis indicating distance, and the first visual indicator being a cursor plotted with respect to the first axis and at least one of the second and third axes;
   move the cursor parallel to the first axis to indicate a change in the actual vehicle speed;
   display a second visual indicator of a deviation between the distance travelled and a target distance, the second visual indicator including a value indicating a magnitude of the deviation between the distance travelled and the target distance;
   scroll the target trace from a first side of the graph to a second side of the graph during the time-based portion of the test cycle to indicate the target vehicle speed with respect to an amount of time elapsed since a start of the test cycle; and
   scroll the target trace from the first side of the graph to the second side of the graph during the distance-based portion of the test cycle to indicate the target vehicle speed with respect to a distance travelled by the vehicle during the test cycle.

2. The method of claim 1 further comprising controlling the electronic display to:
   scroll the target trace from the first side of the graph to the second side of the graph at a constant speed during the time-based portion of the test cycle; and
   during the distance-based portion of the test cycle, adjust a speed at which the target trace is scrolled from the first side of the graph to the second side of the graph based on the distance travelled.

3. The method of claim 1 further comprising controlling the electronic display to adjust an amount of a preview trace displayed based on the actual vehicle speed, wherein the preview trace is a portion of the target trace disposed between the cursor and the first side of the graph.

4. The method of claim 3 further comprising controlling the electronic display to:
   increase the amount of the preview trace displayed when the actual vehicle speed increases; and decrease the amount of the preview trace displayed when the actual vehicle speed decreases.

5. The method of claim 1 wherein:
the second visual indicator includes a line parallel to the first axis,
a distance between the line and the cursor indicates the deviation between the distance travelled and the target distance, and
the method further comprises controlling the electronic display to move the line parallel to at least one of the second and third axes to indicate a change in the deviation between the distance travelled and the target distance.

6. The method of claim 1 wherein the second visual indicator includes an arrow that:
points in a first direction when the distance travelled is less than the target distance; and
points in a second direction opposite of the first direction when the distance travelled is greater than the target distance.

7. The method of claim 1 further comprising controlling the electronic display to adjust a speed at which the target trace is scrolled from the first side of the graph to the second side of the graph during the distance-based portion of the test cycle based on a deviation between the distance travelled and a target distance.

8. The method of claim 7 further comprising controlling the electronic display to:
increase the scroll speed of the target trace when the distance travelled is greater than the target distance; and
decrease the scroll speed of the target trace when the distance travelled is less than the target distance.

9. A method for providing a visual aid to guide a driver of a vehicle when executing a test cycle, the method comprising controlling an electronic display to:
display a graph including a target trace indicating a target speed of the vehicle during the test cycle and a first visual indicator of an actual speed of the vehicle during the test cycle, the target trace being plotted with respect to a first axis indicating speed, a second axis indicating time, and a third axis indicating distance, and the first visual indicator being a cursor plotted with respect to the first axis and at least one of the second and third axes;
move the cursor parallel to the first axis to indicate a change in the actual vehicle speed;
display a second visual indicator of a deviation between the distance travelled and a target distance, the second visual indicator including a value indicating a magnitude of the deviation between the distance travelled and the target distance;
scroll the target trace from a first side of the graph to a second side of the graph to indicate the target vehicle speed with respect to at least one of an amount of time elapsed since a start of the test cycle and a distance travelled by the vehicle during the test cycle; and
adjust an amount of a preview trace displayed based on the actual vehicle speed, wherein the preview trace is a portion of the target trace corresponding to at least one of a future time and a future distance in the test cycle.

10. The method of claim 9 further comprising controlling the electronic display to:
scroll the target trace from the first side of the graph to the second side of the graph to indicate the target vehicle speed with respect to the amount of time elapsed since the start of the test cycle during a time-based portion of the test cycle; and
scroll the target trace from the first side of the graph to the second side of the graph to indicate the distance travelled by the vehicle during a distance-based portion of the test cycle.

11. The method of claim 10 further comprising controlling the electronic display to:
scroll the target trace from the first side of the graph to the second side of the graph at a constant speed during the time-based portion of the test cycle; and
during the distance-based portion of the test cycle, adjust a speed at which the target trace is scrolled from the first side of the graph to the second side of the graph based on the distance travelled.

12. The method of claim 10 further comprising controlling the electronic display to adjust a speed at which the target trace is scrolled from the first side of the graph to the second side of the graph during the distance-based portion of the test cycle based on a deviation between the distance travelled and a target distance.

13. A method for providing a visual aid to guide a driver of a vehicle when executing a test cycle, the method comprising controlling an electronic display to:
display a graph including a target trace indicating a target speed of the vehicle during the test cycle and a first visual indicator of an actual speed of the vehicle during the test cycle;
scroll the target trace from a first side of the graph to a second side of the graph to indicate the target vehicle speed with respect to at least one of an amount of time elapsed since a start of the test cycle and a distance travelled by the vehicle during the test cycle; and
display a second visual indicator of a deviation between the distance travelled and a target distance, the second visual indicator including a value indicating a magnitude of the deviation between the distance travelled and the target distance.

14. The method of claim 13 wherein:
the second visual indicator includes a line,
a distance between the line and the first visual indicator indicates the deviation between the distance travelled and the target distance, and
the method further comprises controlling the electronic display to move the line toward or away from the first visual indicator to indicate a change in the deviation between the distance travelled and the target distance.

15. The method of claim 13 wherein the second visual indicator includes an arrow that:
points in a first direction when the distance travelled is less than the target distance; and
points in a second direction opposite of the first direction when the distance travelled is greater than the target distance.

\* \* \* \* \*